Figure 1:
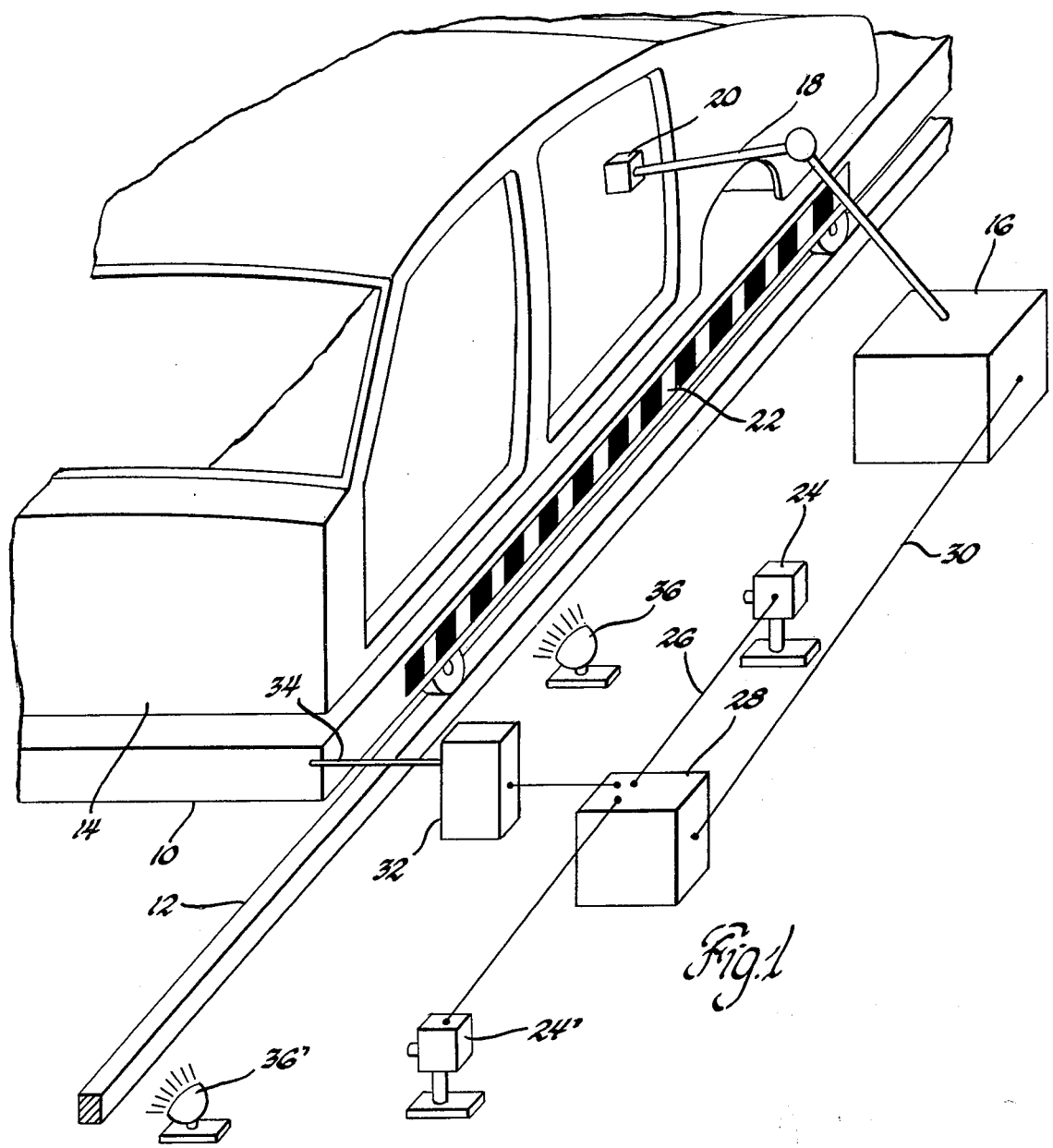

United States Patent [19]

Dewar, Jr. et al.

[11] 4,254,433

[45] Mar. 3, 1981

[54] VISUAL MOTION TRACKING SYSTEM

[75] Inventors: Robert Dewar, Jr., Troy; Rene M. Iadipaolo, Southfield, both of Mich.

[73] Assignee: General Motors Corporation, Detroit, Mich.

[21] Appl. No.: 51,622

[22] Filed: Jun. 25, 1979

[51] Int. Cl.³ .............................................. H04N 7/18
[52] U.S. Cl. ................................... 358/105; 358/101; 358/107; 358/213; 358/125
[58] Field of Search ............... 358/101, 105, 106, 107, 358/213, 125; 235/92 MP

[56] References Cited

U.S. PATENT DOCUMENTS

| | | | |
|---|---|---|---|
| 3,742,901 | 7/1973 | Johnson | 358/101 |
| 4,044,377 | 8/1977 | Bowerman | 235/92 MP |
| 4,096,525 | 6/1978 | Lathan | 358/105 |
| 4,118,730 | 10/1978 | Lemelson | 358/105 |
| 4,148,061 | 4/1979 | Lemelson | 358/101 |

Primary Examiner—Howard W. Britton
Attorney, Agent, or Firm—Warren D. Hill

[57] ABSTRACT

The movement of an article such as a product carried by a conveyor is monitored by providing a patterned target, preferably striped with contrasting lines, to move with the object. A solid state line scan camera views the pattern of the target as it moves relative to the camera and the electronic output of the camera representing the light and dark areas of the target is analyzed by an electronic circuit to determined the movement of the target and therefore of the object being monitored. The resulting electronic signal representing the motion of the object is useful for coordinating the movement of a robot which is operating upon the object during its movement.

4 Claims, 3 Drawing Figures

VISUAL MOTION TRACKING SYSTEM

This invention relates to a system for tracking the motion of an object without contacting the object and particularly to an optical and electronic system for visually tracking object motion.

It is practical to perform many manufacturing operations by robots. Such operations include painting, welding, assembling or manipulating parts. Oftentimes it is desirable to perform the manufacturing operation while the part being operated upon is in motion, that is, carried by a conveyor or other device past a work station. A number of arrangements including mechanical and combination mechanical and electronic devices have been used to track the motion of the article to allow the robot to follow the part even though its movement is nonuniform. Such wholly or partly mechanical systems are characterized by wear, backlash or other sources of inaccuracy as well as a need to mechanically couple and uncouple the sensing device to the part or conveyor.

It is therefore a general object of this invention to provide a system for measuring the motion of an object without a direct mechanical connection with the object. It is a further object of the invention to provide a no contact optical sensing system for tracking the motion of an object and for providing an electronic output signal representing the object motion.

The invention is carried out by providing a target having a pattern of contrasting regions secured to the object for movement therewith, a solid state camera focused on the pattern to produce electrical signals representing a portion of the pattern, and a circuit for analyzing the signals to determine the movement of the pattern with time.

Figure 2:
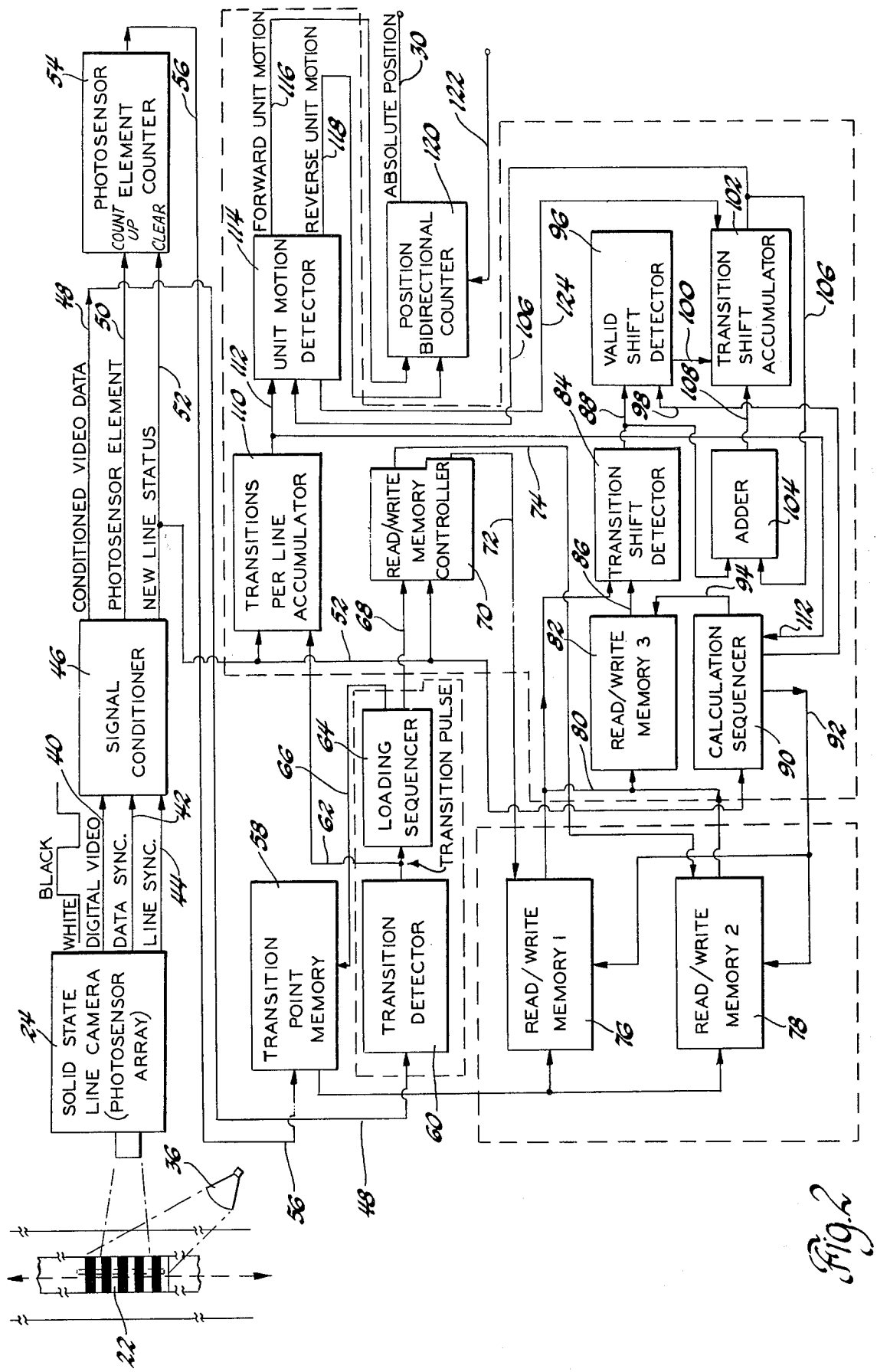

The above and other advantages will be made more apparent from the following specification taken in conjunction with the accompanying drawings wherein like reference numerals refer to like parts and wherein:

FIG. 1 is a perspective view of an automobile mounted on a body truck and a tracking system according to the invention for monitoring the movement of the automobile, the tracking system including an electronic controller and a robot for utilizing the motion information provided by the controller, FIG. 2 is a block diagram of the controller of FIG. 1, and FIG. 3a is a view of an array of photosensors in the camera of FIG. 2, and FIGS. 3b-3e are waveforms representing electronic signals emitted by the camera and occurring elsewhere in the controller system.

By way of example only, the invention is described herein as applied to tracking an automobile body and feeding position information to a robot which operates on the body. The invention is not, however, limited to that application.

Referring to FIG. 1, a body truck 10 moving on rails 12 carries an automobile body 14 being assembled. The body 14 is accurately positioned on the body truck 10 in a predetermined location. A robot 16 having an arm 18 is situated alongside the track 12 to operate upon the body 14 as it moves past the robot. The robot carries a welder 20 or other device for operating on the body 14. In practice such trucks carrying bodies through an assembly line are subject to starting, stopping, reversing and moving at various rates of speed. To accurately track the position of the body from a starting point, a noncontacting motion tracking system is provided. One portion of the system is a target 22 comprising a striped pattern affixed to the side of the truck 10. While a pattern of vertical stripes of white and black is preferred, the exact nature of the pattern is not critical. The width of the stripes, for example, and the uniformity of the stripes is likewise not critical. The important characteristic of the target is that as it moves past a particular point, it will present many transitions between light and dark areas at that point.

A solid state camera 24 spaced from the target 22 is focused on a portion of the target 22. The camera 24 has an output connected by line 26 to a controller 28. As used herein, the terms "line" and "conductor" include multiple conductor cables where required. The controller, in turn, has an output on line 30 connected to the robot 16. A limit switch 32 has a probe 34 for engaging the leading end of the truck 10 as it moves past the robot station. The effect of the limit switch 32 is only to establish an initial position or a "zero reference" for the truck position. Electronic signals from the camera 24, which include information on the movement of the target 22 past the camera, will in conjunction with the zero reference position information from the limit switch 32 enable the controller 28 to continuously compute the position of the truck 10 and hence the body 14 and feed that information via line 30 to the robot 16. In order to avoid all mechanical contact between the motion tracking system and the body 14 or truck 10, the limit switch 32 may, of course, be supplanted by a noncontacting position sensor of an optical variety such as a photocell and light beam arrangement. A lamp 36 is positioned adjacent the rail 12 to illuminate the target 22 in the area being viewed by the camera 24. A second camera 24' downstream from the camera 24 is also connected to the controller 28 to give information on the body position after the target 22 has passed beyond the field of view of the camera 24. A lamp 36' is positioned to illuminate the target at the field of view of the camera 24'. Additional cameras may be cascaded in this manner to maintain a continuous flow of information on the body location. While the target 22 is shown on the side of the truck 10 and the cameras and associated equipment are alongside the path of travel of the truck, the system is versatile and can readily be incorporated in an out of the way position such as underneath the truck.

The movement measuring system is shown in greater detail in block diagram form in FIG. 2. The solid state camera 24 may be an area camera that can be made to act like a line camera, however, the preferred embodiment is a solid state line camera such as a 128 element LC100 line scan camera manufactured by Reticon Corp., Sunnyvale, Calif. That camera includes as its sensor a linear array of 128 photodiodes equally spaced along a path about 6 mm long. The camera further includes a lens assembly to focus the image of the target onto the diode array. It has been found to the desirable to choose a lens such that the camera will, at its desired location, view about 3 or 4 stripes of the target. Those stripes will be sharply focused onto the photodiode array. If, for example, the camera is about 40 cm from the target and each stripe is about 3 mm wide, a lens adjustable from 100 to 135 mm focal length is suitable to obtain an appropriate image.

The line scan camera 24 further includes electronic circuitry to provide certain output signals which result from sequentially scanning the photodiodes and provide output information of the state of illumination of each diode. In particular, the camera 24 has three pairs of output lines 40, 42 and 44, each pair carrying differential output signals. Digital video information is incorporated on the line 40. That information is a binary signal having low and high states depending upon the state of illumination of the diodes being sampled. As each photodiode is sampled, a data synch signal is produced on the pair of lines 42. As a new scan sequence begins a single pulse or line synch occurs on the pair of conductors 44. These conductors 40, 42 and 44 are fed to a signal conditioner circuit 46 which produces corresponding single ended signals (i.e., signals having a value with respect to ground) on lines 48, 50 and 52, respectively. A photodiode element counter 54 receives the data synch signals on line 50 and produces on its output conductor 56 and 8 bit output. The counter is a binary synchronous counter which has a clear terminal connected to the line 52 so that the counter is reset at the beginning of each scan line in accordance with the line synch pulse on line 52. Thereafter, the count increases with receipt of each data synch signal so that the binary output on conductor 56 represents the number of the photodiode which is being interrogated at that instant. The conductor 56 is connected to the input of a transition point memory 58 which is an 8 bit latch. The video data on line 48 is connected to the input of a transition detector 60 which comprises a 1 bit digital comparator. That comparator produces a pulse output on line 62 each time a transition occurs between high and low state of the binary video data signal on line 48. The line 62 is connected to a loading sequencer 64 which produces an output pulse on line 66 a short time after the pulse on line 62. This pulse on line 66 is applied to the transition point memory 58 to trigger that memory to load the 8 bit number present on the conductor 56. After a second longer time delay, the loading sequencer 64 produces on line 68 a second pulse which is directed to the input of a read/write memory controller 70. That controller comprises a 1 bit counter having complementary output signals on line 72 and 74 which control the operation of read/write memory 1, 76 and read/write memory 2, 78. The controller 70 has an input connected to the line synch signal on line 52 which provides the primary control of the controller 70. The output of the transition point memory 58 is connected to the data input of the memories 1 and 2. While the transition point memory 58 has capacity only for a single 8 bit word, the read/write memories 1 and 2 each has sufficient capacity for storing all the transition points occurring in each line. A capacity for 8 words is sufficient. The data output line 80 of each of the read/write memories 1 and 2 is connected to the input of a read/write memory 3, 82 and to an input of a transition shift detector 84. The read/write memory 3 is essentially the same as memories 1 and 2. It has a data output on line 86 which is also connected to an input of the transition shift detector 84.

The transition shift detector 84 is a digital subtractor which compares the signals on lines 80 and 86 and produces on line 88 a signal representing the difference therebetween. The calculation sequencer 90 has an output on line 92 connected to the read/write memories 1 and 2 and an output on line 94 connected to the read/write memory 3. The sequencer 90 is programmed to address predetermined portions of the various memories for effecting a readout on lines 80 and 86 to present the data stored at those addresses to the transition shift detector 84. A reset input of the calculation sequencer is connected to the line 52 carrying the line synch data. Each line synch signal initiates the calculation sequencer operation. A valid shift detector 96 has a data input terminal connected to line 88 and a synch signal input connected to line 98 which is an output signal from the calculation sequencer 90. The valid shift detector 96 is a ROM comparator and gating logic which is preprogrammed to produce an output signal on line 100 whenever the value of the signal on line 88 is within ±4 but not zero. The resulting signal on line 100 is a load command to transition shift accumulator 102 which is an edge triggered latch. An adder 104 has as inputs the signal on line 88 and a signal on line 106 which is the output of the transition shift accumulator 102. The output of the shift adder on line 108 is the data input to the transition shift accumulator 102. Whenever a load signal on line 100 is presented to the transition shift accumulator, the value contained therein is added by the adder 104 to the signal on line 88 and the sum then is stored as the new value in the transition shift accumulator.

A transitions per line accumulator 110 has an input connected to line 62 which carries the transition pulses and an input connected to line 52 carrying the line synch pulse. The accumulator 110 then counts the number of transitions which occur in each line and stores that information while the next line is scanned. That stored information is provided on the output line 112 which is fed to an input of the calculation sequencer 90 for storage therein and is also fed to one input of a unit motion detector 114. A second input to detector 114 is line 106 carrying the accumulated pulse information. The unit motion detector is a ROM comparator which functions as a digital comparator to compare the signal on line 106 to that on 112. Whenever the signal on line 106 reaches the value of that on 112, the output line 116 is energized by a pulse if the sign of the information on line 106 is positive indicating forward unit motion and the output line 118 is energized by a pulse if the data on line 106 represents reverse unit motion. For the optical geometry described above, each unit motion pulse represents a movement of 0.1 mm of the truck 10. The lines 116 and 118 are fed to the up and down count terminals respectively of a bidirectional position counter 120 which stores the net movement of the target. A reset signal is applied on 122 to the counter 120 from the limit switch 32 so that the counter contents is zero when the truck 10 reaches the limit switch. Thus, any information in the counter which is accumulated thereafter represents a distance which the body 10 has moved from the zero reference. The output of the counter 120 is applied on line 30 which is connected to the robot 16 thereby providing the robot with continuous information on the position of the truck 10 and the body 14.

Figure 3:
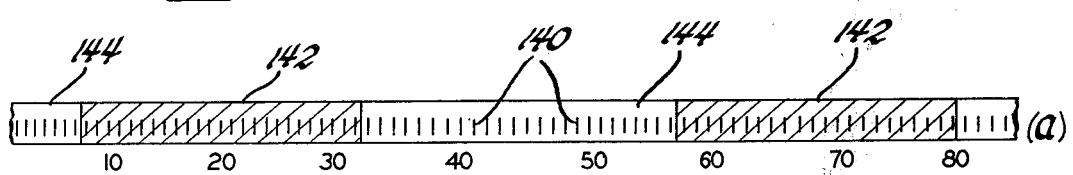
Figure 3:
Figure 3:
Figure 3:
Figure 3:
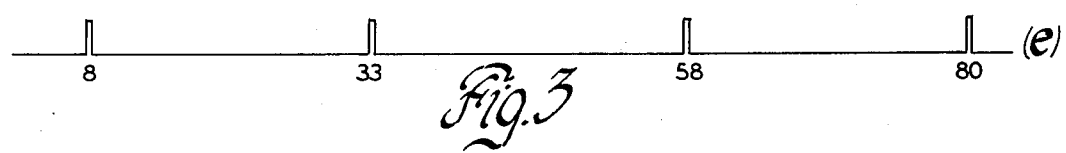

The operation of the system is further explained with reference to the waveforms and the diode array of FIG. 3. It is assumed here, for convenience, that an array of 83 photodiodes is employed. In FIG. 3a the series of parallel lines 140 which are related to numbers 1-83 represent the photodiodes or photosensor elements of the camera 24. The shaded areas 142 and the clear areas 144 superimposed on the diodes represent the image of the dark and light stripes respectively which are focused on the photodiode array. The waveform of FIG. 3b represents the digital video output of the camera on lines 40 and 48. The signal assumes a low state during bright illumination by the white stripes and a high state during dim illumination corresponding to the shaded areas 142. In scanning the diodes in the order of 1 to 100, the first diode to reveal a transition is the eighth diode so that the first positive going leading edge of the wave 3b occurs at the diode position 8 and similarly the trailing edge occurs at diode 33 since that is the next diode to sense a transition of illumination value. Similarly, diodes 58 and 80 represent transition points in the photodiode array. The series of pulses in FIG. 3c represents the data synch pulses on lines 42 and 50. One pluse is emitted as each diode 1 to 83 is scanned or interrogated for determination of its illumination level. FIG. 3d shows a single pulse prior to the first data synch pulse which represents the line synch pulse on lines 44 and 52 which occurs prior to each new line scan. The counter 54 is cleared or set to zero by the line synch pulse and then the data synch pulses are counted by the counter 54. At any instant the contents of the counter reveals the photodiode which is currently being scanned. As shown in FIG. 3e, a pulse is produced at each transition by the transition detector 60. That waveform then is the one occurring on the line 62 and has pulses occurring at the positions 8, 33, 58 and 80 for the particular case under consideration. In response to each of these pulses, the loading sequencer causes the transition point memory 58 to momentarily memorize the 8 bit counter output on line 56. Then before the next transition pulse occurs on line 62, the loading sequencer activates the read/write controller 70 to cause one of the memories, say, read/write memory 1 to write the binary word in the memory 58 into an assigned address in memory 1. Thus, the transition point memory 58 sequentially momentarily stores each of the transition points 8, 33, 58 and 80 and memory 1 then stores those values one after the other.

Assume the line scan process just described refers to line N, and that the target moves slightly and another scan N+1 is made. Assume that for the line N+1, the transition points are 9, 34, 59 and 81. The counter 54 has been cleared by the line synch and the new transitions were identified by the contents of the counter when the transitions occurred. The new line synch for line N+1 triggered the read/write memory controller 70 to place the read/write memory 1 in read mode and the memory 2 in write mode. The binary words representing the new transition points are then written into the memory 2. The contents of memory 1 representing the transition points of line N are, prior to the scanning of line N+2, loaded into the read/write memory 3 under command of the calculation sequencer 90. Then during the scan of line N+2, the new transition points are written into the memory 1. During that scan the calculation circuit including the calculations sequencer, the transition shift detector 84, valid shift detector 96, the transition shift accumulator 102 and the adder 104 compare the contents of the read/write memory 2 with the read/write memory 3 to determine what transition point shifts have occurred, if any. Every value in memory 2 is compared with each value in memory 3. Thus, 9 is compared with 8, 33, 58 and 80. One of those four comparisons, of course, results in a difference of 1, whereas the other three differences are very large and are invalid since they do not represent the shift of a particular transition.

While the transition shift detector 84 produces a difference signal on line 88 representing each comparison, the valid shift detector 96 recognizes difference signals of an absolute value of 4 or less. When such a valid shift is detected, the load signal on line 100 causes the transition shift accumulator 102 to accept a new value which is a sum of its old value appearing on line 106 and the difference signal on line 88. In this manner, the amount of the transitions are algebraically accumulated.

For the example discussed here, the transitions per line accumulator 110 senses 4 transitions for each line. That information on line 112 is compared with the information on line 106 by the unit motion detector 114. Each time 4 shifts are accumulated the unit motion detector produces a pulse on the output line 116 or 118 and simultaneously a reset pulse is applied by the unit motion detector on line 124 to clear the transition shift accumulator. So long as the camera scan frequency is fast relative to the velocity of the body truck 10, the difference signals will have maximum absolute value of one. Then the accumulated value in accumulator 102 will never exceed the value of the signal on line 112, and the accumulator will be reset when its content is exactly equal to the line 112 signal. If the object velocity is great enough to cause difference signals greater than one, the accumulator 102 can attain a value greater than that on line 112. Then rather than clearing the accumulator 102 to reset it, it is desirable to subtract the value of the signal on line 112 from the accumulator 102 contents thereby retaining the remainder in the accumulator. A circuit modification to accomplish this is obvious to those skilled in the art. The position counter 120 algebraically sums the pulses on lines 116 and 118 to provide a running account of the displacement of the truck 10 from the zero reference position in terms of the digital number on the output line 30. In the above example, 4 transitions occur per line and 4 valid shifts were detected so that 1 unit of motion was detected. In the event the accumulated shift value is less than the indicated number of transitions per line, the value is held in the transition shift accumulator 102 until sufficient shifts have occurred to cause the net value to attain the number of transitions per line.

It will thus be seen that the system described herein provides for accurate tracking of an object without mechanical coupling to the object and yields an instantaneous electrical output signal representative of the object position or displacement.

The embodiments of the invention in which an exclusive property or privilege is claimed are defined as follows:

1. An optical and electronic motion tracking system for measuring movement of an object comprising
   a pattern of contrasting light and dark regions on the object for movement therewith,
   a lens focused on the pattern to produce an image of the pattern in an image plane, a linear array of equally spaced photosensor elements in the plane of the focused image wherein the element spacing corresponds to a certain object displacement, and each element is energized to a high or low state according to the brightness of the image focused thereon, whereby movement of the object effect a change of state of at least one of the elements,
   scan means for interrogating the energization state of the elements and generating output signals representing the states of the elements and for periodically repeating the interrogation for subsequent array scans,
   means responsive to the output signals for generating a transition signal representing each image transition between light and dark regions, a circuit responsive to the transition signals for comparing the transition signals for each scan with that of a preceding scan to thereby detect a difference in transition signals which denotes the amount and direction of movement of the focused image relative to the photosensor elements, and means responsive to said detected difference to produce a signal representing net object movement over a time period encompassing many scans.

2. An optical and electronic motion tracking system for measuring movement of an object comprising a pattern of contrasting light and dark regions on the object for movement therewith, a solid state camera focused on the pattern, the camera including at least one linear array of equally spaced photosensor elements in the plane of the focused image wherein the element spacing corresponds to a certain object displacement, and each sensor is energized according to the brightness of the region focused thereon, the camera further including sensor scan means to interrogate serially the energization state of the elements and generate output signals representing the states of the elements and to periodically repeat the interrogation for subsequent array scans, counter means for serially producing an output of consecutive digital numbers representing the elements in synchronism with each scan, transition detector means responsive to the output signals for generating a transition signal each time the change in levels of adjacent output signals signifies an image transition between light and dark regions, memory means responsive to the transition signals and counter output for memorizing for each scan the numbers of the elements representing transition points, shift detector means for comparing the memorized numbers of each scan with those of the previous scan to detect the amount and direction of shift of the transition points thereby providing a measurement of object movement between scans, and accumulator means for accumulating the net object movement over a time interval encompassing many scans.

3. An optical and electronic motion tracking system for measuring movement of an object comprising a pattern of contrasting light and dark regions secured to the object for movement therewith, a solid state line camera focused on the pattern, the camera including at least one linear array of equally spaced photosensor elements in the plane of the focused image wherein the element spacing corresponds to a certain object displacement, and each sensor is energized according to the brightness of the region focused thereon, the camera further including sensor scan means to interrogate serially the energization state of the elements and generate output signals representing the states of the elements and to periodically repeat the interrogation for subsequent array scans, counter means for serially producing consecutive digital numbers representing the elements in synchronism with each scan, transition detector means responsive to the output signals for generating a transition signal each time the change in levels of adjacent output signals signifies an image transition between light and dark regions, memory means responsive to the transition signals and the counter produced digital numbers for memorizing for each scan the numbers of the elements representing transition points, shift detector means for comparing each of the memorized numbers of each scan with each of those of the previous scan to provide a plurality of difference signals including small and large signals representing valid shift and spurious values respectively, comparator means having a stored small reference value for comparing the absolute value of the difference signals with the small reference value to produce a valid shift signal when a given difference signal is equal to or less than the reference value, means responding to the valid shift signal and the difference signals for algebraically adding the valid difference signals to determine the net amount and direction of shift of the transition points, and means for signalling an increment of object movement when the said net amount attains the number of transitions per each array scan.

4. An optical and electronic motion tracking system for measuring movement of an object comprising a pattern of contrasting light and dark regions secured to the object for movement therewith, a solid state camera focused on the pattern, the camera including at least one linear array of equally spaced photosensor elements in the plane of the focused image wherein the element spacing corresponds to a certain object displacement, and each sensor is energized according to the brightness of the region focused thereon, the camera further including sensor scan means to interrogate serially the energization state of the elements and generate output signals representing the states of the elements and to periodically repeat the interrogation for subsequent scans, counter means for serially producing an output of consecutive digital numbers representing the elements in synchronism with each scan, transition detector means responsive to the output signals for generating a tansition signal each time the change in levels of adjacent output signals signifies an image transition between light and dark regions, memory means including two primary read/write memories responsive to the transition signals and counter output for alternately memorizing transition data comprising the numbers of the elements representing transition points, for each scan, and a secondary read/write memory, control means for effecting the storage of transition data from alternate scans in alternate primary memories and for loading the data from the one primary memory containing the lease recent transition data into the secondary memory to make available the said one primary memory for storage of subsequently generated transition data, shift detector means for comparing the memorized numbers of each scan in the other of the primary memories with those of the previous scan in the secondary memory to detect the amount and direction of shift of the transition points thereby providing a measurement of object movement between scans, and accumulator means for accumulating the net object movement over a time interval encompassing many scans.

* * * * *